United States Patent [19]
McMullen

[11] 3,841,649
[45] Oct. 15, 1974

[54] SNOW AND WATER VEHICLE

[76] Inventor: Wayne W. McMullen, 1103 93rd Ln. N.W., Coon Rapids, Minn. 55433

[22] Filed: Jan. 31, 1973

[21] Appl. No.: 328,394

[52] U.S. Cl................... 280/16, 115/1 C, 180/3 R, 180/7 P, 280/21 R
[51] Int. Cl...................... B62b 13/00, B62m 27/00
[58] Field of Search ....................280/21 RA, 16; 180/3 R, 7 P; 115/1 C; 114/43

[56] References Cited
UNITED STATES PATENTS

| | | | |
|---|---|---|---|
| 2,340,558 | 2/1944 | Porter | 180/3 R |
| 3,480,289 | 11/1969 | Larkin | 280/21 R |
| 3,583,507 | 6/1971 | Trautwein | 180/3 R |

Primary Examiner—Leo Friaglia
Assistant Examiner—Randall A. Schrecengost

[57] ABSTRACT

A vehicle adapted for use over water and snow having a floatable elongated hull or body supportable on a tripod of laterally fixed elongated lifting support members, such as skis or pontoons. The lifting support members are associated with the hull by a control linkage system, a center lifting support member, and symmetrical side lifting support members. All the lifting support members are simultaneously extendible and retractable relative to the hull. The side lifting support members are selectively extendible and retractable relative to one another to impart directional control to the vehicle. In a preferred embodiment, seat means cooperate with a steering column and the control linkage system to extend the lifting support members and maintain them in the extended configuration with respect to the hull.

16 Claims, 5 Drawing Figures

SNOW AND WATER VEHICLE

BACKGROUND OF THE INVENTION

Many snow and water vehicles of the prior art include vehicles having hull structures supported on a tripod arrangement of lifting support members such as skis or pontoons. See U.S. Pat. No. 3,480,289 to Larkin. Typically such vehicles include a pair of symmetrically disposed side lifting support members and a center member which is laterally rotatable about a vertical axis to steer the vehicle. An inherent disadvantage of such steering means is that the steering member, upon rotation, may slip or skid over the surface for a distance under the inertia of the vehicle prior to imparting a turning motion to the vehicle. It is therefore been recognized as advantageous to provide suitable mechanism for vertically moving the side members in the turning configuration to assist in the turn. See U.S. Pat. No. 2,905,479 to Schomers.

Typically the lifting skis or pontoons are attached to the vehicle by rigid downwardly projecting struts which space the members from the vehicle. See U.S. Pat. No. 2,340,558 to Porter. When the vehicle is at rest as, for example, in a body of water, the members are located beneath the surface of the water. In order to properly perform a lifting function, the members must have a velocity and be on top of the surface. Upon acceleration of the vehicle from the resting position, the members develop a significant drag force beneath the water surface until sufficient velocity is obtained by the vehicle to surface the members. If the velocity of the vehicle is low, the members will drag beneath the surface of the water.

SUMMARY OF THE INVENTION

This invention relates to a vehicle adapted to travel over snow or water or a similar yieldable surface. The vehicle rides on a tripod of elongated lifting support means connected to an elongated floatable hull or body of the vehicle by the unique control linkage of the invention. Lifting support means includes a plurality of lifting support members constituted as streamlined pontoons, skis or the like. A control means cooperates with the lifting support members to simultaneously extend or retract them relative to the hull, thereby assisting in the acceleration of the vehicle from a resting position and offering the driver an optional operating configuration. A center lifting support member is centered relative to the hull, and side lifting support members are symmetrically positioned on either side of the hull longitudinally spaced from the center member. Directional control of the vehicle is achieved by the selective exension and retraction of the slide lifting support members relative to one another.

A preferred embodiment of the invention is equipped with a generally vertically disposed tubular steering column mounted to the hull structure by pivot means and adapted to rotate in a longitudinal plane relative to the hull. The upper portion of the steering column cooperates with a connecting linkage to raise and lower the center ski relative to the hull or rearward and forward rotational movement, respectively, of the upper portion of the column. Mounted for axial rotation within the steering column is a steering shaft projection outwardly from either end of the steering column. The lower portion of the steering shaft cooperates with a connecting linkage to raise and lower side skis relative to the hull upon rearward and forward movement, respectively, of the upper portion of the steering column. Additional linkage cooperates with a crosshead member attached to the lower portion of the shaft to extend and retract the side skis relative to one another upon axial rotation of the shaft within the column. A steering wheel is attached to the upper portion of the shaft. Seat means linked to the steering column assists in the rearward movement of the column to simultaneously lower the skis. Propulsion means include a propeller mounted rearwardly on the hull driven by an internal combustion engine.

An object of the invention is to provide a vehicle for travel over snow and water. A second object of the invention is to provide such a vehicle having lifting support members simultaneously extendible and retractable relative to the hull of the vehicle. A further object of the invention is to provide such a vehicle having a pair of lifting support members symmetrically disposed on opposite sides of the vehicle and selectively extendible and retractable relative to one another to provide directional control for the vehicle. A further object of the invention is to provide, for such a vehicle, a unique control linkage associating the lifting surface members with the vehicle body.

IN THE DRAWINGS

DESCRIPTION OF A PREFERRED EMBODIMENT

Figure 1:
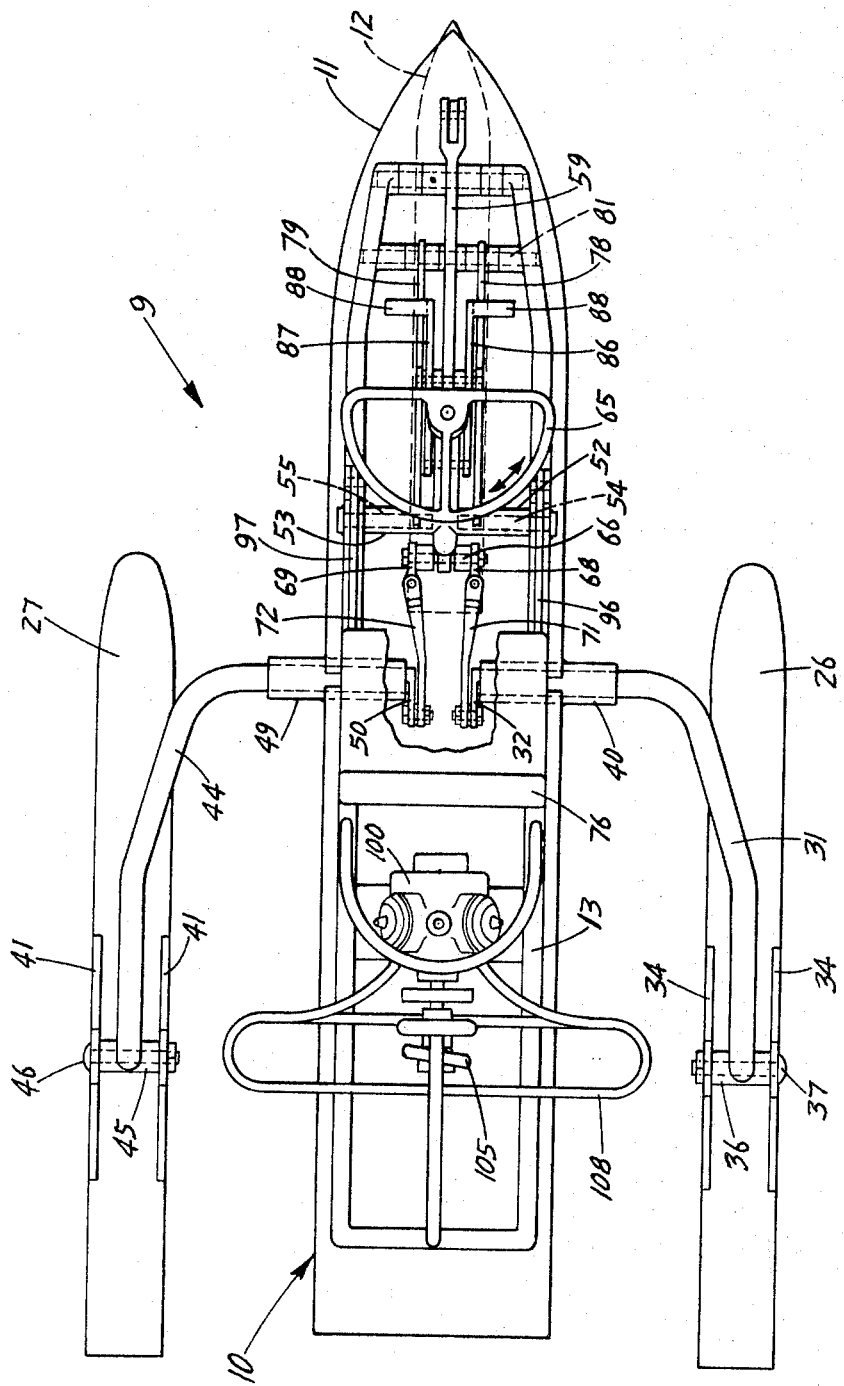
FIG. 1 is an elevational view of a preferred embodiment of the vehicle of the invention with portions broken away to better illustrate the vehicle.
Figure 2:
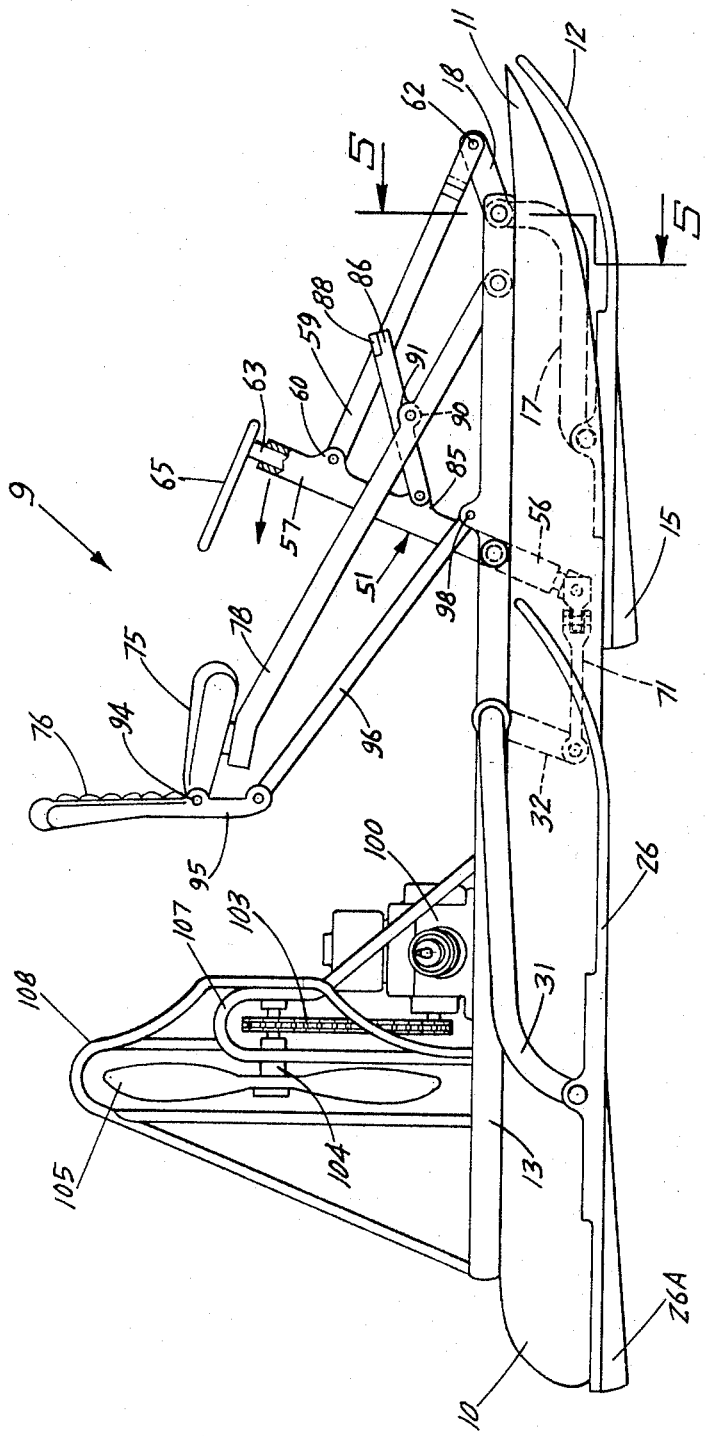
FIG. 2 is a plan view of a preferred embodiment of the vehicle of the invention having the lifting support members in a retracted configuration.
Figure 3:
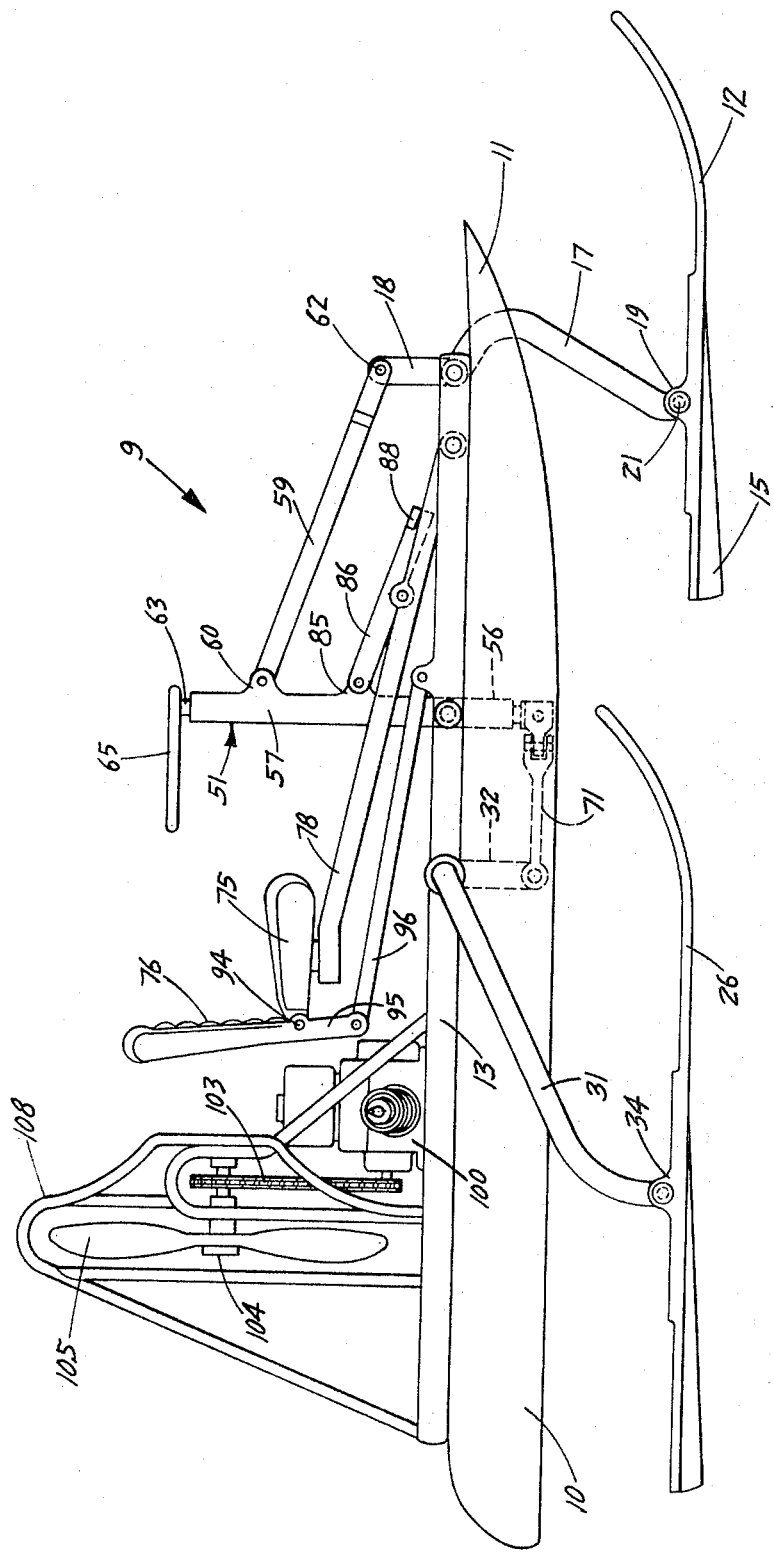
FIG. 3 is a plan view of a preferred embodiment of the vehicle of the invention having the lifting support members in an extended configuration.
Figure 4:
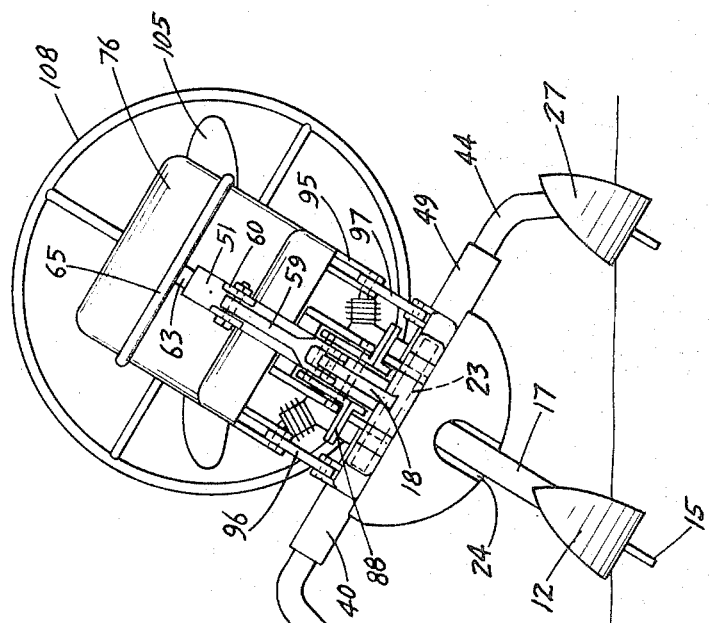
FIG. 4 is a front view of a preferred embodiment of the vehicle of the invention in a turning configuration.

Shown in FIGS. 1 through 5 is a preferred embodiment of the vehicle of the invention, indicated generally at 9. In FIGS. 1 and 2, the vehicle 9 is shown with downwardly extendible lifting support members 12, 26 and 27 in a retracted configuration. FIG. 3 shows the same vehicle 9 having the lifting support members 12, 26 and 27 in an extended configuration. FIG. 4 illustrates the vehicle 9 in a turning configuration.

The vehicle 9 includes an elongated buoyant body or hull 10 having a streamlined forward or bow portion 11. A rigid frame structure 13 is fastened to the top surface along the periphery of the hull 10. In assembled relationship to the hull 10 and the frame 13 is the unique control linkage system of the invention providing means for the simultaneous extension or retraction of the lifting support means relative to the hull 10. Additionally, the control linkage system provides directional control means whereby side lifting support members 26 and 27 on either side of the hull 10 are extendible and retractable relative to one another for the steering of the vehicle on water or snow or the like.

In the proximity of bow portion 11 of the hull 10 is a laterally stationary center lifting support member 12 shown as an elongated runner or ski. The member 12 could also be, for example, a pontoon having a suitable streamlined profile. Center ski 12 is laterally fixed from rotation about a vertical axis and includes an elongated flat portion and an upwardly curved forward portion. Rearward on the bottom surface of center ski 12 is attached a downwardly projected stabilizing keel 15.

Center ski 12 is centered relative to hull 10 and is attached for movement relative to hull 10 by front lever means, shown to include a center pivot leg 17 and center pivot arm 18. Center ski 12 is pivotally attached to the free or movable end of center pivot leg 17. Symmetrically positioned on either side of the flat portion of center ski 12 are integral upwardly projecting portions 19, provided with axially aligned eyes. The free end of pivot leg 17 includes an integral horizontally disposed sleeve 16 positioned between and in axial alignment with the eyes of the projections 19. A pivot pin 21 passes through the aligned eyes and the sleeve 16, thereby pivotally connecting the center ski 12 and pivot leg 17. The center pivot leg 17 extends from the center ski 12 to the bow portion 11 of hull 10 where there is mounted in the frame 13 a laterally disposed horizontal fulcrum bar 23. The fixed end of center pivot leg 17 terminates in an eye which engages the fulcrum bar 23.

Figure 5:
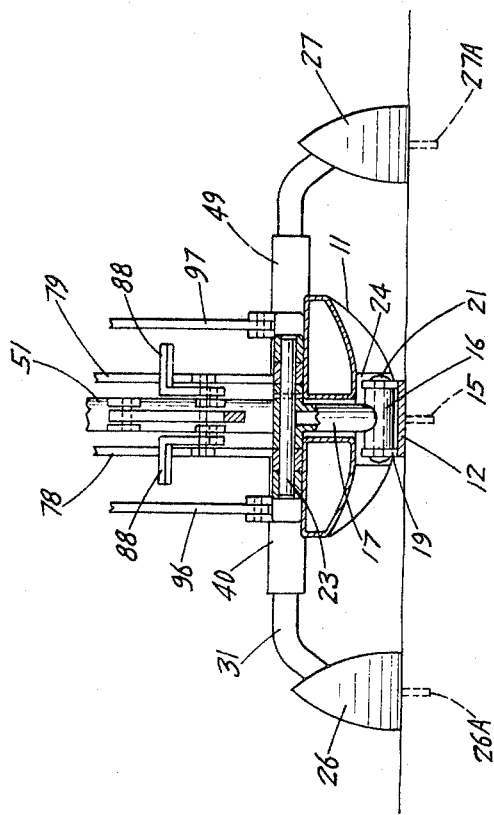
FIG. 5 is a sectional view of a preferred embodiment of the vehicle of the invention taken along the line 5—5 of FIG. 2.

The fixed end of center pivot arm 18 is rigidly attached to the fixed end of center pivot leg 17 and extends outwardly from fulcrum bar 23 in a direction generally opposite to center pivot leg 17. Thus, movement of the free end of center pivot arm 18 results in extending and retracting movement of center ski 12 relative to the hull 10. When center ski 12 is in a retracted configuration, as best seen by FIG. 5, center pivot leg 17 is accommodated in a recess 24 provided in the bow portion 11 of hull 10.

Rearwardly on the hull 10, side lifting support members 26 and 27 are provided assembled to the hull 10 in extendible and retractable relationship. Side lifting support members 26 and 27 are shown to include a right ski and a left ski assembled in symmetric relationship relative to the hull 10. Right ski 26 and left ski 27 are similar in description to the center ski 12, having elongated flat portions, upwardly curving forward portions, and stabilizing keels 26A and 27A attached to the rearward bottom portion of each ski.

As shown in FIG. 1, extension and retraction means for right ski 26 include a right pivot leg 31 and a right crank arm 32. Right ski 26 has on either side of the flat portion, upwardly extending side portions 34 provided with axially aligned eyes. The free or movable end of the right pivot leg 31 includes a horizontal sleeve 36 in axial alignment with and disposed between the eyes provided in the side portions 34. A pivot pin 37 passing through the aligned eyes and the sleeve 36 pivotally connects right ski 26 to right pivot leg 31. Pivot pin 37 is secured in place by a suitable nut threaded on the end.

Right pivot leg 31 extends from right ski 26 at its free or movable end to a right bearing sleeve 40. Right bearing sleeve 40 is secured in the frame 13 on the right side of the hull 10, having an axis horizontally and laterally disposed with respect to the hull 10. Toward the fixed end, right pivot leg 31 bends inwardly, terminating in a shaft end passing through bearing sleeve 40 and adapted to rotate therein. To this end, there could be provided, for example, suitable roller bearings to facilitate such rotation. The shaft end of right pivot leg 31 inboard of the hull 10 and bearing sleeve 40, is rigidly connected to the fixed end of right crank arm 32. By movement of the free or movable end of right crank arm 32, it may be seen that right ski 26 extends or retracts relative to the hull 10.

Left ski 27 and corresponding extension and retraction members are symmetrical to those on the right side. Left ski 27 has upwardly projecting side portions 41 provided with axially aligned eyes. A left pivot leg 44 has at the movable or free end a lateral horizontally disposed sleeve 45 accommodated between the side members 41, 41 and in axial alignment with the eyes provided therein. A pivot pin 46, secured by a nut, pivotally assembles the left ski 27 and the left pivot leg 44. Pivot leg 44 extends to a left bearing sleeve 49 symmetrically disposed opposite the right bearing sleeve. Left pivot leg 44 terminates in a shaft end portion passing through the bearing sleeve 49 and rigidly connected to the fixed end of the left crank arm 50.

While those portions of the linkage system providing the leverage for the extension and retraction of the individual lifting support members have been shown and described, there will now be described the coordinating linkages which provide first extension and retraction means for the simultaneous extension and retraction of the lifting support members, as well as second extension and retraction means for the extension and retraction of side lifting support members relative to one another for directional control.

An elongated generally vertical, hollow center tube or steering column 51 is centrally mounted by pivot means in the frame structure 13 of hull 10. Column 51 is located longitudinally between center ski 12 and side skis 26, 27. A pair of hollow tubular bearing and support members 52, 53 on the right and left sides, respectively, are attached, as by welding or the like, to opposite sides of the column 51, disposed laterally with respect to hull 10 and having axes perpendicular to the axis of column 51. Bearing members 52, 53 terminate in open ends adjacent inboard portions of the frame 13. A pair of rods 54, 55 are securely positioned in the frame 13 on the right and left sides in proximity to the open ends of bearing members 52, 53, and extend inboard coaxially into bearing members 52, 53 on the right and left sides respectively. The bearing members 52, 53 are adapted to rotate relative to the respective rods 54, 55, for example, as by the presence of a suitable bearing structure or lubricant between the outer surface of the rods 54, 55 and the inner surface of the bearing members 52, 53. It may be seen that column 51 is mounted for easy rotation in a forward and rearward direction in a longitudinal plane relative to the hull 10.

Steering column 51 has a lower portion 56 disposed beneath the mounting structure, and an upper portion 57 above the mounting structure. An elongated member or center connecting bar 59 is pivotally connected to the upper portion 57 of column 51 at a pair of outward extended cleats 60 on the steering column. The opposite end of the connecting bar 59 is forked or bifurcated to pivotally connect with the free end of the center pivot arm 18 as at 62. Through the connecting bar 59, rotation of steering column 51 in a forward or rearward direction is translated into retracting or extending movement of center ski 12 relative to the hull 10 through the center pivot arm 18 and center pivot leg 17.

An elongated steering shaft 63 is positioned coaxially in column 51 and extends outward from column 51 at either end. Steering shaft 63 is mounted in column 51 by suitable bearing structures (not shown) and is adapted to axially rotate within column 51. A steering wheel, shown to be a semi-circular tubular member 65, is rigidly fastened in perpendicular relationship to the top of the steering shaft 63. Conventional manipulation of the steering wheel 65, therefore, results in rotation of the steering shaft 63 within the column 51.

The opposite end of the steering shaft 63 extends downwardly from the lower portion 56 of the column 51. The lower end of steering shaft 63 is rigidly attached to a transverse horizontal member or crosshead 66. Crosshead 66 is operably connected at its respective ends to right crank arm 32 and left crank arm 50 through a universal or swivel type joint. Connected at either end of crosshead 66 are 90° turned links 68 and 69 on the right and left ends respectively. The links 68, 69 are pivotally connected to the respective ends of crosshead 66 and are, at the portion so connected, adapted to rotate in vertical plane. Each link 68, 69 has a second portion turned 90° to a horizontal plane from the portion attached to the crosshead 66.

To the extended turned portion of each of the links 68, 69 there are pivotally attached connecting members 71, 72 on the right and left sides, respectively. A bifurcated end provided on the right connecting member 71 engages the horizontal portion of the right link 68. A pin pivotally connects the bifurcated end of right member 71 and the horizontal portion of right link 68. Likewise, left member 72 engages and is coupled to the left link 69.

The opposite end of the right connecting member 71 is pivotally coupled to the free or movable end of right crank arm 32. Similarly, the opposite end of left connecting member 72 is pivotally coupled to the left crank arm 50.

Manipulation of the steering wheel 65 in conventional fashion causes the right ski 26 and the left ski 27 to extend and retract relative to one another via the above described linkage. For example, the steering wheel may be turned in a counter clockwise direction, when viewed from above. The steering shaft 63 and the crosshead 66 experience a like angular rotation. The right end of crosshead 66, through the right coupling linkage, urges the free end of right crank arm 32 forward, resulting in the extension of right ski 26. Simultaneously, the left end of crosshead 66, through the left coupling linkage, urges the free end of left crank arm 50 rearward, resulting in the retraction of left ski 27. The resultant turning configuration is shown in FIG. 4, where the vertical is in a left turn attitude.

Through manipulation of the steering column 51, the left and right skis as well as the center skis are made to simultaneously extend or retract relative to the hull 10. For example, if the skis are in the retracted configuration, as shown in FIG. 2, rearward movement of the upper portion of the column 51, as by pulling on the steering wheel 65, causes the skis to simultaneously extend relative to the hull 10. Column 51, through connecting link 59, rotates the free end of center pivot arm 18, thereby causing center ski 12 to extend. Simultaneously, the lower portion of shaft 63, through connecting members 72, 73 rotates right crank arm 32 and left crank arm 50, causing extension of right ski 26 and left ski 27 relative to the hull 10.

In the preferred embodiment of the vehicle of the invention as shown in FIGS. 1 through 5, lever means are provided cooperating with the seat for assisting in the simultaneous extension of the lifting support members and means for releasably biasing said members in the extended configuration.

Seat means includes a generally horizontal seat portion 75 and a generally vertical brackrest portion 76. A pair of long lever bars 78, 79 are each attached at one end to the underside of the seat portion 75, on the right and left sides of the seat 75, respectively, and connect seat means to an assisting toggle linkage. The lever bars 78, 79 extend forward and downward from the seat 75, straddling column 51. A transverse bar 81 extends laterally across the bow portion 11 of the hull 10 secured between opposite portions of the frame 13. The lever bars 78, 79 terminate in laterally disposed sleeves which engage the transverse bar 81 and are adapted to rotate about it.

Beneath the point of attachment of center connecting link 59 to steering column 51, there is a second pair of forward projections 85 on the upper portion 57 of column 51. A pair of symmetrical toggle bars 86, 87 each are pivotally connected at one end to a projection 85 and extend generally forward in diverging relationship to lever bars 78, 79. Approximately midway of its length, right toggle bar 86 has a downwardly extending projection 90 which faces adjacent an upward projection 91 on the right lever bar. A pin through the mating projections pivotally connects right toggle bar 86 to right lever bar 78. Likewise, left toggle bar 87 is coupled to left lever bar 79. At its free or movable end, each of the toggle bars 86, 87 has a stop or handle 88 projecting in an outboard direction.

The backrest portion 76 is hinged at 94 to the seat 75 and is provided with a pair of downwardly extending side brackets 95. A pair of backrest support bars 96, 97 are hinged at one end to the backets 95 of the backrest. The backrest support bars extend forward and downward, having their opposite ends hinged, as at 98, to extended portions of the frame 13.

Referring to FIG. 2, it may be seen that when an operator sits on the seat portion 75 of the vehicle, the weight of the operator produces a leverage force through the lever bars 78, 79. The force is transmitted from the lever bars 78, 79 through the toggle bars 86, 87 to the steering column 51. The toggle bars 86, 87 force the steering column 51 in a rearward direction, thereby simultaneously extending the lifting support members. Referring to FIG. 3, when the lifting support members are in the fully extended configuration, the stops or handles 88 on the free ends of the toggle bars 86, 87 engage the upper surface of the respective lever bars 78, 79 to inhibit further rearward movement of the steering column 51. Over-center lock means are provided to releasably lock the support members in the extended configuration. In the fully extended configuration, as shown in FIG. 3, the lateral axis of the pivot points connecting the toggle bars 86, 87 and the lever bars 78, 79 has dropped below an imaginary line connecting the pivot point 85 and the transverse pivot bar 81. Therefore, the lifting support members in the extended configuration, as shown, are in stable equilibrium and will not retract under the weight of the vehicle when the force is released from either the seat 75 or the steering column 51. To again retract the lifting surface members, the operator may either lift the seat 75 or grasp either of the handles 88 and pull upward until the lateral axis between the pivot points of the toggle bars 86, 87 and the lever bars 78, 79 is again above an imaginary line connecting the pivot point 85 with the transverse bar 81. The lifting surface members will then retract under the weight of the vehicle.

Propulsion means for the vehicle are shown to include a conventional rearwardly disposed propeller driven by an internal combustion engine. An internal combustion engine 100 is mounted behind the seat means. Engine 100 has a crankshaft extending rearwardly and having fastened to it a suitable sprocket to accommodate a drive chain 103. A tubular framework 107 supports a rearward facing propeller shaft 104. A propeller 105 is mounted to the shaft. Propeller shaft 104 has a sprocket in vertical alignment with the sprocket on the crankshaft 102. A drive chain 103 operably connects the respective sprockets. A suitable guard framework 108 surrounds the propeller for the protection of the operator and others in proximity to the vehicle.

In the use of the vehicle 9 of the invention, for example, in water, the vehicle 9 is first at rest in the water with the lifting surfaces in the retracted configuration. The operator mounts the vehicle and starts the engine. Initially the vehicle 9 moves through the water with the skis still retracted. As the vehicle gains velocity, the skis 12, 26 and 27 develop a lifting force, and the operator may extend the skis relative to the hull 11 by sitting on the seat 75 and pulling back on the wheel 65. In the operating configuration, the vehicle 9 moves swiftly over the water with a minimum amount of drag on the vehicle. The operator steers the vehicle 9 by conventional manipulation of the steering wheel 65 to extend and retract the side skis 26 and 27 relative to one another. The lifting support skis are locked in the extended configuration by the over-center lock means.

While the embodiment of the invention shown and illustrated is provided with manual means for the extension and retraction of the lifting service members, it is understood that automated means could as well be provided without departing from the scope of the invention. For example, a conventionally actuated hydraulic cylinder and piston could be secured between the frame 13 and the center ski 12 to extend to retract the ski 12 relative to the hull, simultaneously extending or retracting the right and left side skis. Also, the seat 75 can be mounted on the frame 13 and a power unit, as a hydraulic cylinder, can be used to move control column 57 to extend or retract the skis 12, 26 and 27.

The embodiments of the invention in which an exclusive property or privilege is claimed are defined as follows:

1. A vehicle for travel over snow and water including:

a buoyant hull;
a plurality of generally horizontal lifting support means assembled to the hull to provide lifting support to the hull, including a pair of side lifting support members symmetrically positioned on either side of the hull;
linkage means interconnecting the plurality of support means;
first extension and retraction means associated with the linkage means operable to selectively simultaneously extend the lifting support means and retract the lifting support means relative to the hull; and
second extension and retraction means associated with the linkage means operable to selectively extend one side lifting support member relative to the hull and to retract the other side lifting support member relative to the hull to impart directional control to the vehicle.

2. The vehicle of claim 1 wherein: the lifting support means includes a center lifting support member assembled to the hull.

3. The vehicle of claim 2 wherein: said lifting support members are skis.

4. The vehicle of claim 2 wherein: said lifting support members are streamlined pontoons.

5. The vehicle of claim 1 wherein: said first extension and retraction means includes an elongated column rotatably assembled to the hull, said column operably associated with the linkage means whereby upon rotation of the column in one direction the side lifting support members simultaneously extend relative to the hull, and upon rotation of the column in the opposite direction, the side lifting support members simultaneously retract relative to the hull.

6. The vehicle of claim 5 wherein: said column is a hollow tubular column and wherein said second extension and retraction means includes an elongated steering shaft having a portion positioned in said column and axially rotatable within said column, said shaft operably associated with the linkage means whereby upon rotation of the shaft within the column in one direction a side lifting support member is retracted relative to the opposite side lifting support member, and upon rotation of the shaft in the opposite direction the same side lifting support member is extended relative to the opposite side lifting support member.

7. The vehicle of claim 5 including: lever means, seat means attached to one end of the lever means, said lever means assembled to the hull, said lever means operably connected to the column whereby upon application of a downward force to the seat means, lever means rotates the column to simultaneously extend the lifting surface members relative to the hull.

8. The vehicle of claim 7 including: locking means cooperating with lever means to releasably lock the lifting surface members in an extended position relative to the hull.

9. The vehicle of claim 1 including: propulsion means mounted to the hull to propel the vehicle.

10. The vehicle of claim 9 wherein: said propulsion means includes an internal combustion engine mounted rearwardly on the hull, a rearwardly directed propeller, and drive means between the engine and the propeller whereby the engine drives the propeller.

11. The vehicle of claim 1 wherein: the lifting support means includes a longitudinally fixed center lifting support member movably connected to a forward portion of the hull, said first extension and retraction means including an elongated column, pivot means rotatably mounting the column to the hull for movement about a transverse axis, said linkage means being connected to the column whereby upon rotation of the column on the pivot means in one direction the side lifting support members and center lifting support members simultaneously extend relative to the hull and upon rotation of the column in the opposite direction the side lifting support members and center lifting support members simultaneously retract relative to the hull.

12. A vehicle for travel over a yieldable surface including:
   a buoyant hull;
   a plurality of lifting support members movably assembled to the hull;
   said plurality of lifting support members movable between a first retracted position relative to said hull and a second extended position relative to said hull;
   two of said lifting support members being extendible and retractable relative to each other;
   first means for simultaneous movement of the plurality of lifting support members between the first retracted position and the second retracted position; and
   second means for extending movement of one of said two lifting surface members and retracting movement of the other lifting surface member relative to the hull to impart directional control to the vehicle.

13. The vehicle of claim 12 wherein the plurality of lifting support members includes: a pair of side lifting support members disposed on either side of the hull and a center lifting member longitudinally spaced from the side lifting support member, and wherein said side lifting support members are movable in extended and retracted relationship relative to one another.

14. The vehicle of claim 13 wherein said lifting support members are skis.

15. The vehicle of claim 12 wherein: said linkage means includes releasable lock means for holding the lifting support members in their extended positions.

16. The vehicle of claim 15 including: movable seat means and means connecting the seat means to the linkage means whereby movement of the seat means will move the lock means to a position holding the lifting support members in their extended positions.

* * * * *

PO-1050
(5/69)

UNITED STATES PATENT OFFICE
CERTIFICATE OF CORRECTION

Patent No. 3,841,649    Dated October 15, 1974

Inventor(s) Wayne W. McMullen

It is certified that error appears in the above-identified patent and that said Letters Patent are hereby corrected as shown below:

Column 1, line 54, "exension" should be --extension--; same line, "slide" should be --side--.

Column 1, line 62, "or" should be --on--.

Column 1, line 65, "projection" should be --projecting--.

Column 6, line 10, "brackrest" should be --backrest--.

Column 6, line 40, "backets" should be --brackets--.

Column 7, line 49, "to" (second occurrence) should be --or--.

Signed and sealed this 3rd day of December 1974.

(SEAL)
Attest:

McCOY M. GIBSON JR.
Attesting Officer

C. MARSHALL DANN
Commissioner of Patents